(12) United States Patent
Andreola et al.

(10) Patent No.: US 11,012,534 B2
(45) Date of Patent: May 18, 2021

(54) NODE FOR A MULTI-HOP COMMUNICATION NETWORK, RELATED LIGHTING SYSTEM, METHOD OF UPDATING THE SOFTWARE OF LIGHTING MODULES AND COMPUTER-PROGRAM PRODUCT

(71) Applicant: OSRAM GmbH, Munich (DE)

(72) Inventors: Cristian Andreola, Spresiano (IT); Stefano Pidutti, Paese (IT)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 16/487,442

(22) PCT Filed: Feb. 20, 2018

(86) PCT No.: PCT/IB2018/051023
§ 371 (c)(1),
(2) Date: Aug. 21, 2019

(87) PCT Pub. No.: WO2018/154433
PCT Pub. Date: Aug. 30, 2018

(65) Prior Publication Data
US 2019/0379764 A1 Dec. 12, 2019

(30) Foreign Application Priority Data
Feb. 23, 2017 (IT) .......................... 102017000020770

(51) Int. Cl.
*G06F 15/177* (2006.01)
*H04L 29/08* (2006.01)
(Continued)

(52) U.S. Cl.
CPC ................ *H04L 67/34* (2013.01); *G06F 8/65* (2013.01); *H04L 12/66* (2013.01); *H04L 67/125* (2013.01)

(58) Field of Classification Search
CPC ........ H04L 67/34; H04L 67/125; H04L 12/66; G06F 8/65
(Continued)

(56) References Cited

U.S. PATENT DOCUMENTS 7,152,099 B1 * 12/2006 Arens ............... H04L 29/12235
709/220
8,024,723 B2 * 9/2011 Nahm .................... H04L 67/104
717/172
(Continued)

FOREIGN PATENT DOCUMENTS

KR 20140145306 A 12/2014

OTHER PUBLICATIONS

International Search Report based on Application PCT/IB2018/051023 (4 pages) dated Apr. 18, 2018 (for reference purposes only).
(Continued)

*Primary Examiner* — Alicia Baturay
(74) *Attorney, Agent, or Firm* — Viering, Jentschura & Partner MBB

(57) ABSTRACT

A node for a multi-hop communication network may include a wireless communication interface, configured to exchange data with the multi-hop communication network. The node moreover includes a processing unit, configured to drive the operation of the node as a function of the commands received via the wireless communication interface, and a memory storing a firmware for the processing unit. The node is configured to receive, via the wireless communication interface, an updated firmware, and to store the updated firmware into the memory. Moreover, the node is configured to detect, via the wireless communication interface, other nodes that are in the vicinity of the node, and to send (1010) the firmware stored in the memory to one or more of said nodes.

13 Claims, 9 Drawing Sheets

(51) Int. Cl.
  *G06F 8/65* (2018.01)
  *H04L 12/66* (2006.01)
(58) Field of Classification Search
  USPC .......................................................... 709/221
  See application file for complete search history.

(56) References Cited

U.S. PATENT DOCUMENTS

| | | | | |
|---|---|---|---|---|
| 8,710,983 | B2* | 4/2014 | Malkowski | G08B 13/22 |
| | | | | 340/539.22 |
| 8,713,557 | B2* | 4/2014 | Keys | H04L 45/025 |
| | | | | 717/171 |
| 9,301,365 | B2* | 3/2016 | Reed | H05B 45/37 |
| 10,069,834 | B2* | 9/2018 | Chen | H04W 4/70 |
| 10,079,691 | B2* | 9/2018 | Christopher | H04L 12/66 |
| 10,104,741 | B2* | 10/2018 | Choi | H05B 45/325 |
| 10,193,981 | B2* | 1/2019 | Cook | H04W 24/02 |
| 10,217,914 | B2* | 2/2019 | Cha | H01L 33/505 |
| 10,237,939 | B2* | 3/2019 | Coombes | H05B 45/20 |
| 10,333,733 | B2* | 6/2019 | Chamarajnager | H04L 67/12 |
| 10,368,407 | B2* | 7/2019 | Luccato | H05B 47/11 |
| 10,383,200 | B1* | 8/2019 | Romano | H04L 12/2809 |
| 10,390,404 | B2* | 8/2019 | Luccato | H05B 45/10 |
| 10,432,461 | B2* | 10/2019 | Yocam | H04L 67/1076 |
| 10,616,974 | B2* | 4/2020 | Teshome | G05B 15/02 |
| 10,623,274 | B2* | 4/2020 | Elcock | H04L 41/22 |
| 10,698,675 | B2* | 6/2020 | Bathen | G06F 8/65 |
| 10,705,821 | B2* | 7/2020 | Yang | H04L 63/1408 |
| 2002/0044549 | A1* | 4/2002 | Johansson | H04L 45/46 |
| | | | | 370/386 |
| 2004/0190468 | A1* | 9/2004 | Saijonmaa | H04L 29/06027 |
| | | | | 370/312 |
| 2004/0261071 | A1* | 12/2004 | Chuang | H04L 41/082 |
| | | | | 717/170 |
| 2007/0245347 | A1* | 10/2007 | Oya | H04L 67/34 |
| | | | | 717/176 |
| 2008/0130639 | A1* | 6/2008 | Costa-Requena | H04L 67/16 |
| | | | | 370/389 |
| 2009/0130971 | A1* | 5/2009 | Piekarski | H04L 67/28 |
| | | | | 455/3.01 |
| 2013/0335219 | A1 | 12/2013 | Malkowski | |
| 2019/0350050 | A1* | 11/2019 | Piironen | H04W 88/16 |
| 2020/0104299 | A1* | 4/2020 | Carlson | H04L 67/1097 |

OTHER PUBLICATIONS

"CC2531 Zlight2 Reference Design", Texas Instruments, 2012, http://www.ti.com/tool/CC2531ZLIGHT2-RD.

* cited by examiner

NODE FOR A MULTI-HOP COMMUNICATION NETWORK, RELATED LIGHTING SYSTEM, METHOD OF UPDATING THE SOFTWARE OF LIGHTING MODULES AND COMPUTER-PROGRAM PRODUCT

CROSS-REFERENCE TO RELATED APPLICATIONS

The present application is a national stage entry according to 35 U.S.C. § 371 of PCT application No.: PCT/IB2018/051023 filed on Feb. 20, 2018; which claims priority to Italian Patent Application Serial No.: 102017000020770, which was filed on Feb. 23, 2017; all of which are incorporated herein by reference in their entirety and for all purposes.

TECHNICAL FIELD

The description relates to multi-hop/mesh networks. Various embodiments of the present description refer to updating the firmware of lighting modules connected to each other via a multi-hop/mesh network.

BACKGROUND

FIG. 1 shows a lighting system including a plurality of lighting modules 10. For example, FIG. 1 shows six lighting modules $10_1 \ldots 10_6$.

Generally speaking, each lighting module includes one or more light radiation sources, such as e.g. one or more LEDs (Light Emitting Diodes) or other solid-state light radiation means, e.g. laser diodes. Generally speaking, each lighting module 10 may therefore be on or off. Moreover, one or more lighting modules 10 may enable an adjustment of the emitted light intensity, so-called dimming function. For example, the lighting modules 10 may be:

RGB, e.g. LED, lamps, including at least three light radiation sources, respectively emitting red light (R), green light (G) and blue light (B), or RGBW, e.g. LED, lamps, including at least four light radiation sources respectively emitting red light (R), green light (G), blue light (B) and white light (W).

Generally speaking, one or more lighting modules 10 may thus enable adjusting the colour of the emitted light.

In order to monitor and/or control the various functions of the lighting modules 10, the lighting modules 10 may be mutually connected via a communication network 30. For example, in some solutions each lighting module 10 supports the ZigBee® communication protocol, or another communication protocol adapted to create multi-hop or mesh networks, such as e.g. Thread, 6LOWPAN, Mesh over Bluetooth® Low Energy Network (BLE). For example, such lighting modules are described in the document "CC2531 Zlight2 Reference Design", Texas Instruments, 2012, http://www.ti.com, the content whereof is incorporated herein by way of reference.

For example, as shown in FIG. 2, said lighting module 10 may include an electronic converter 102 and at least one light radiation source 104. For example, the electronic converter 102 may include an AC/DC or DC/DC switching supply, which receives at input, via two terminals T1 and T2, a supply signal (e.g. from the mains or a battery) and outputs, via two terminals T3 and T4, a regulated voltage $V_{out}$ or a regulated current $i_{out}$. The light radiation 104 may be for example a LED or a LED string.

The light radiation source 10 moreover includes a bidirectional radio (i.e. wireless) communication interface 106, which typically has a short range (e.g. between 5 and 200 m), such as e.g. a ZigBee, Bluetooth, Wi-Fi communication interface (according to the IEEE 802.11 standard).

Finally, the lighting module 10 includes a processing unit 108, which is configured to receive commands via the communication interface 106 and to drive the operation of the electronic converter 102 as a function of the received commands, e.g. in order to switch the light radiation sources 104 on or off, and/or adjust the brightness and/or the colour of the light emitted by the light radiation sources. For example, the processing unit 108 is often implemented via a microprocessor, which has a memory 110 associated thereto which stores the code being executed by the microprocessor.

Typically the electronic converter 102, the communication interface 106 and the processing unit 108 (with memory 110) are integrated in one housing 100, and are often mounted onto a single printed circuit. Generally speaking, the light radiation sources 104 may also be integrated in said housing 100, e.g. they may be mounted on the printed circuit itself, or they may be connected externally to the electronic converter 102 via cables.

Generally speaking, one or more lighting modules 10 may also include one or more sensors 112 and/or actuators 114, in order to perform monitoring and/or control functions. For example, sensors 112 may include one or more of the following:

sensors configured to monitor the operation of the electronic converter 102 and/or the light radiation sources 104, and/or sensors configured to monitor environmental parameters (light, temperature, humidity etc.) and/or movement sensors, e.g. Passive InfraRed (PIR) sensors.

On the other hand, the actuators 114 may include one or more electrical or electronic switches, in order to control the on/off switching of other devices and/or motors, e.g. in order to orient the light emitted by the light radiation sources 104.

Therefore, the processing unit 108 may be configured to detect the data provided by the sensors 112 and to send the data (optionally in processed form) through the communication interface 106. Moreover, the processing unit 106 may be configured to drive actuators 112 as a function of the detected data.

Therefore, as shown in FIG. 1, the lighting modules 10 are connected to each other via a communication network 30. For instance, with reference to the ZigBee® standard, the lighting modules 10 may only perform the function of a ZigBee End Device. However, the lighting modules 10 are configured to implement, in addition, the function of a ZigBee Router, and optionally of a ZigBee Coordinator.

Typically, the network 30 also includes a gateway node 20, enabling access to the communication network 30 by devices which do not support the protocol used for the communication network 30.

For example, as shown in FIG. 3, such a gateway node 20 typically includes a communication interface 206 matching the protocol of the communication network, e.g. a ZigBee interface. For example, with reference to the ZigBee standard, said gateway node 20 may implement the function of a ZigBee Router and optionally of a ZigBee Coordinator.

The gateway node 20 also includes one or more further communication interfaces 202 for a wired or wireless communication, such as e.g.:

a Wi-Fi communication interface 202a for the communication with a wireless communication network; and/or an Ethernet communication interface 202b for the connection to a Local Area Network (LAN); and/or a transceiver, which may be a GSM (Global System for Mobile Communications), CDMA (Code Division Multiple Access), W-CDMA (Wideband Code Division Multiple Access), UMTS (Universal Mobile Telecommunications System), HSPA (High-Speed Packet Access) and/or LTE (Long Term Evolution) transceiver, for the connection to a Wide Area Network (WAN), such as the Internet; and/or one or more further communication interfaces 202d, which are typically supported by mobile devices (laptop computers, tablets or mobile phones), such as e.g. USB (Universal Serial Bus), Bluetooth, NFC (Near Field Communication).

Finally, the gateway node 20 includes a processing unit 204, configured to manage the information exchange between the communication interfaces 202 and 206.

Therefore, generally speaking, said function of the gateway node 20 may also be implemented in one or more lighting modules 10, e.g. by employing one or more further communication interfaces (see the description of interface 202) and including the functions performed by the processing unit 204 into the communication interface 206.

Therefore, in FIG. 1, a further device 40 such as e.g. a remote control, a computer, a tablet or a mobile phone, may control the operation of the lighting modules 10 by sending commands to a communication interface 202 of the gateway node 20, and the gateway node 20 may forward said commands to network 30.

Specifically, the communication network 30 is a multi-hop or mesh network, i.e. one or more lighting modules 10 perform the function of a router, in order to forward the commands to one or more other lighting modules 10 which are not adapted to directly receive the commands from the gateway node 20, e.g. because they are located too far away.

For example, in FIG. 1, the lighting modules $10_1$ and $10_2$ may be reached directly. Said lighting modules $10_1$ and $10_2$ may forward the commands to the lighting modules $10_3$ and $10_4$, respectively. Finally, the lighting module $10_5$ may exchange data with the lighting modules $10_3$, $10_4$ and $10_6$. For example, in order to send a command to the lighting module $10_6$, the respective data package may actually traverse the lighting modules $10_1$, $10_3$ and $10_5$.

Therefore, thanks to the presence of a multi-hop network 30 and the gateway node 20, device 40 is adapted to control and/or monitor the operation of the lighting devices 10.

For example, as shown in FIG. 4a, the device 40 may have installed an application which enables turning the various lighting modules 10 on or off. For example, for each lighting module 10 a respective name 400 and a respective on/off switch 402 may be shown.

On the other hand, FIG. 4b shows a screen which may be opened e.g. by pressing name 400 in the screen shown in FIG. 4a, enabling the setting of brightness and/or colour in the light emitted by the respective lighting module 10. For example, the screen shown in FIG. 4b may display the name 404 of the respective lighting module 10, a button 406 for switching the respective lighting module 10 on or off, a bar 408 for setting the brightness of the respective lighting module 10 and a colour map 410 enabling selecting the colour of the respective lighting module 10.

A firmware update of the lighting modules 10 may frequently be required, e.g. at least of a portion of the software code stored in memory 110 (see FIG. 2). For example, said updates may be useful in order to correct errors and/or to implement new functions.

Generally speaking, said update of a lighting module 10 may be carried out by sending the new firmware to the lighting module 10 through network 30, implementing a so-called Over The Air (OTA) update.

For instance, FIG. 5a shows an example wherein device 40 is connected to a remote server 52, e.g. through the Internet 50. For example, the remote server 52 may be associated to a database 54, which stores the firmware for one or more types of lighting modules 10, which may be classified e.g. on the basis of a model number which may indicate e.g. the hardware version and/or the supported functions.

Device 40 may therefore detect the type of each lighting module 10 connected to network 30, download the corresponding firmware and update the respective lighting module 10, by sending the firmware to the lighting device 10 through the gateway node 20 and the communication network 30.

On the other hand, FIG. 5b shows an example wherein the gateway node 20 is adapted to communicate (directly through an interface 202) with the remote server 52. For example, in FIG. 5b the gateway node 20 is connected to the Internet 50. In this case, the processing unit 204 (see FIG. 3) may implement an update server which automatically monitors the type of each lighting module 10 connected to network 30, downloads the corresponding firmware (e.g. if a newer version is available) and updates the respective lighting module 10, by sending the firmware to the lighting module 10 through network 30.

SUMMARY

The inventors have observed that multi-hop networks show a drawback in that the update of the software/firmware of the lighting modules 10 may be inefficient. As a matter of fact, typically, multi-hop networks are designed so as to have a low energy consumption. Therefore, also the bandwidth available for the communication is limited. For example, a typical update of a single lighting module 10 may take up to several minutes.

However, the lighting system described in the foregoing may be employed in the industrial field or for street lighting, wherein a high number of lighting modules 10 are connected to the communication network 30. Therefore, the software update of all lighting modules 10 may take up to several hours.

Therefore, various embodiments of the present specification aim at providing solutions for improving the software update of the nodes in a multi-hop network, specifically of lighting modules.

According to various embodiments, said object is achieved thanks to a node of a multi-hop network having the features set forth in the claims that follow. The claims also concern a corresponding lighting system and a method of updating the software of lighting modules, as well as a computer program product, which may be loaded into the memory of at least one processor and which includes software code portions adapted to implement the method steps when the product is run on at least one processor. As employed herein, the reference to said computer program product indicates a processor-readable medium, containing instructions for controlling the processing system, in order to coordinate the implementation of the method. The reference to "at least one processor" may be implemented in a modular and/or distributed form.

As stated in the foregoing, the present description concerns a node for a multi-hop communication network.

Said node includes a wireless communication interface, configured to exchange data with the multi-hop communication network, as well as a processing unit configured for driving the operation of the node as a function of commands received through the wireless communication interface. Specifically, the processing unit has an associated memory storing a firmware for the processing unit. For example, in various embodiments, the node is a lighting module including an electronic converter configured to supply at least one light radiation source. In this case, the processing unit drives the operation of the electronic converter as a function of commands received via the wireless communication interface.

In various embodiments, the node is configured to receive, via the wireless communication interface, an updated firmware.

For example, in various embodiments, said firmware is sent directly to the node, i.e. the node receives the firmware by analysing a point-to-point, multi-cast or broadcast communication addressed to the node.

In addition or as an alternative, the node may analyse the content of a multi-hop communication which traverses the node, so as to extract the firmware from a communication addressed to another node.

Subsequently, the node stores the updated firmware into its memory. Specifically, in various embodiments, the node determines if the received updated firmware is compatible with the node and, if said updated firmware is compatible, the node stores the updated firmware, so that the processing unit may use the updated firmware.

In various embodiments, the node is configured to independently send its own firmware to other nodes in the network. For this purpose the node detects, through the wireless communication interface, other nodes in the vicinity of the node, i.e. nodes which may be reached via a single-hop communication. Subsequently the node sends, to one or more said nodes, the firmware stored in the memory.

For example, in various embodiments, the node detects the model number and the version of the node firmware. The node also detects the model number and the firmware version of other neighbour nodes. Subsequently, the node determines the other nodes which have a model number corresponding to the model number of the node, and which have a firmware version which is older than the firmware version of the node. Finally, the node sends such nodes the firmware stored in the memory. Generally speaking, the node may send the firmware to the other neighbour nodes via a point-to-point, multi-cast or broadcast communication.

Therefore, each node may behave, from the point of view of OTA firmware updating, as a special server. That is to say, it is adapted to propagate its own firmware to similar nodes. Said procedure takes place in a distributed fashion, silently and automatically, like a virus spreading by infecting neighbour compatible organisms. Therefore, this method does not involve a multitude of OTA general servers, because this would imply the need of conspicuous memory resources, in order to manage a plurality of different firmware. In the present case, the resources needed do not increase, because in the simplest of cases each node only transmits its own firmware to the compatible nodes which require the same.

The presently described solution is particularly useful for lighting systems including a plurality of lighting modules implementing the automatic updating function described in the foregoing. As a matter of fact, a lighting system typically includes a high number of lighting devices of the same type, i.e. nodes having the same model number.

Therefore, it may be sufficient to update a single lighting module in order to update all the lighting modules in the system.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the illumination apparatus. In the following description, various aspects are described with reference to the following drawings, in which.

DETAILED DESCRIPTION

In the following description, various specific details are given to provide a thorough understanding of the embodiments. The embodiments may be practiced without one or several specific details, or with other methods, components, materials, etc. In other instances, well-known structures, materials or operations are not shown or described in detail in order to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in a suitable manner in one or more embodiments.

The headings provided herein are for convenience only, and therefore do not interpret the extent of protection or scope of the embodiments.

In the following FIGS. 6 to 10 the parts, elements or components which have already been described with reference to FIGS. 1 to 5 are denoted with the same references which have previously been used in said Figures; the description of said previously described elements will not be repeated in the following, in order not to overburden the present detailed description.

As previously mentioned, the present specification aims at providing solutions for updating the firmware/software of nodes of a multi-hop network, such as e.g. lighting modules 10. Therefore, the presently described solutions may be used e.g. in the system described with reference to FIGS. 1 to 5, and the corresponding description applies entirely.

In various embodiments, the firmware updating is improved by including a software module into the processing unit 108 of each node/lighting module 10, wherein said additional software module implements an update server having limited capacities.

Figure 1:
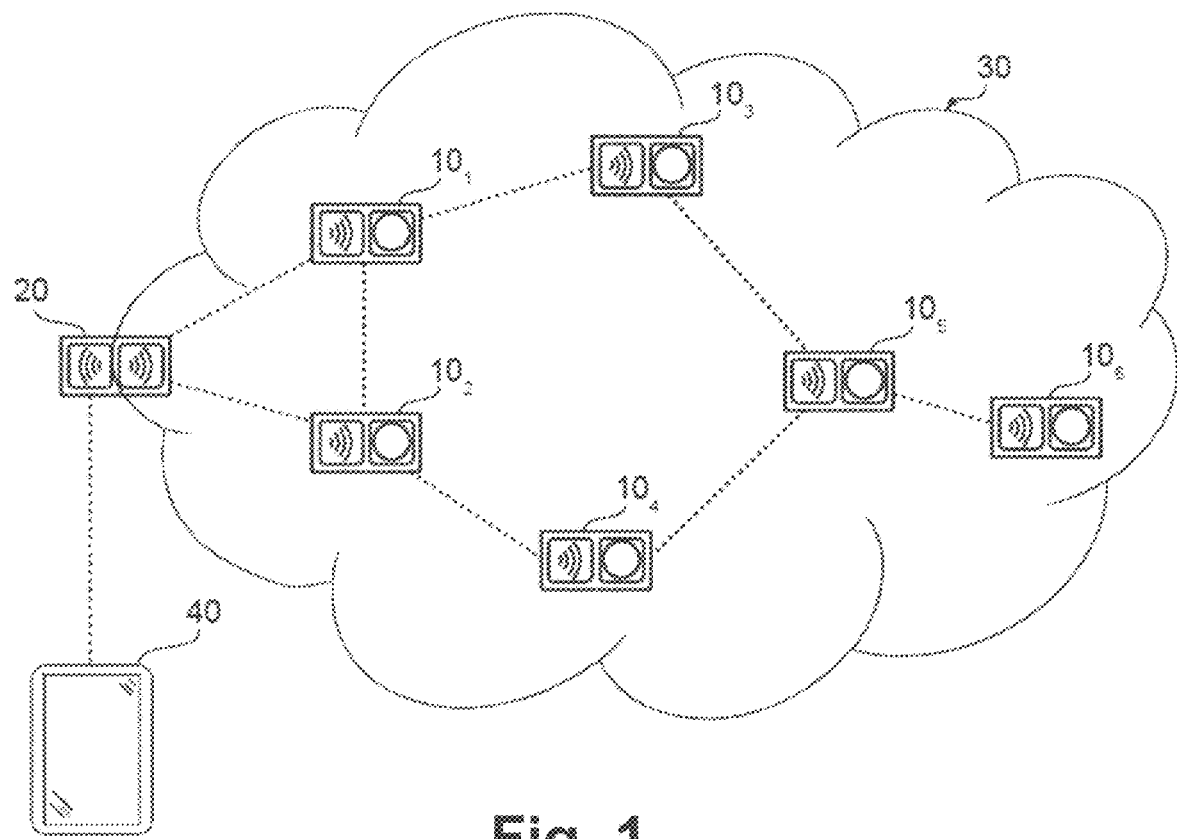
FIGS. 1 to 5 have already been described in the foregoing.
Figure 2:
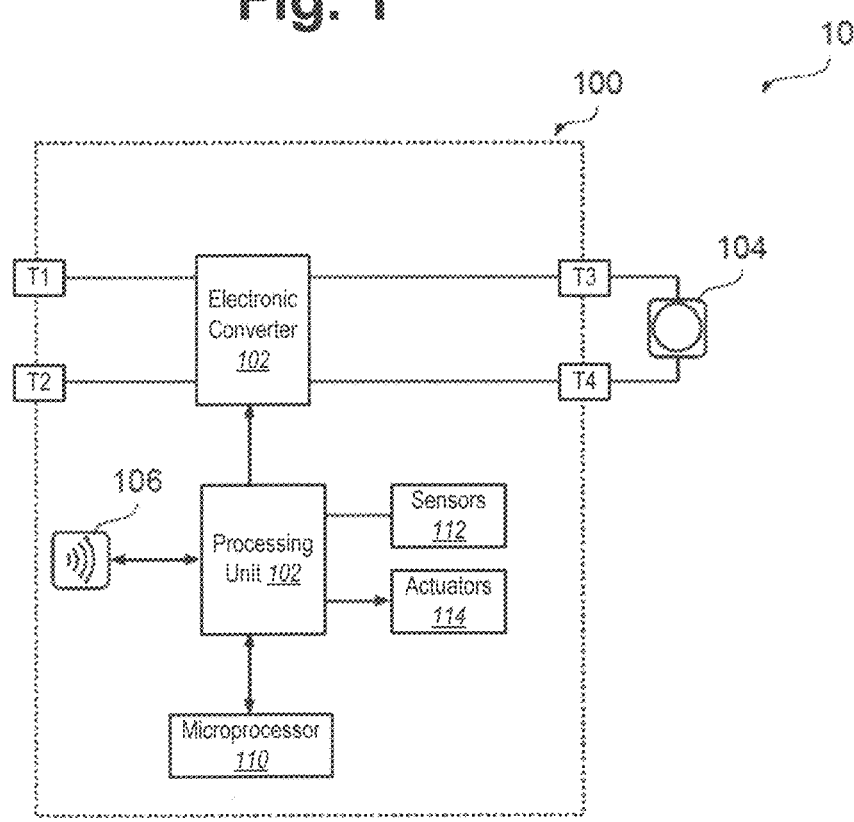
Figure 3:
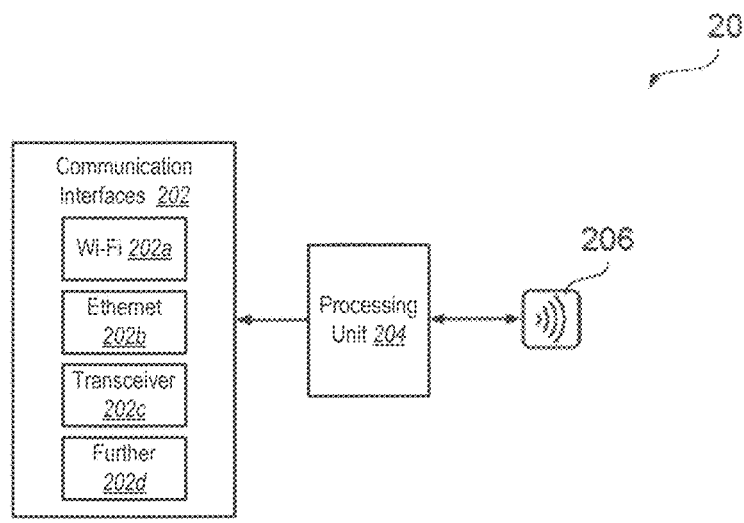
Figure 4A:
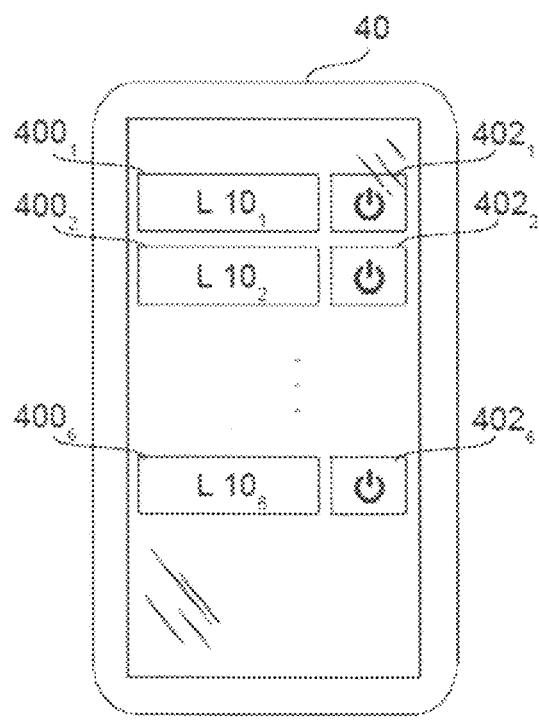
Figure 4B:
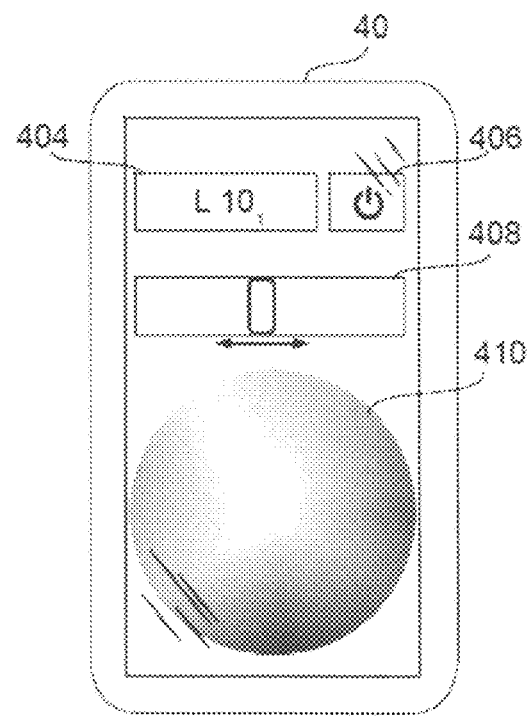
Figure 5A:
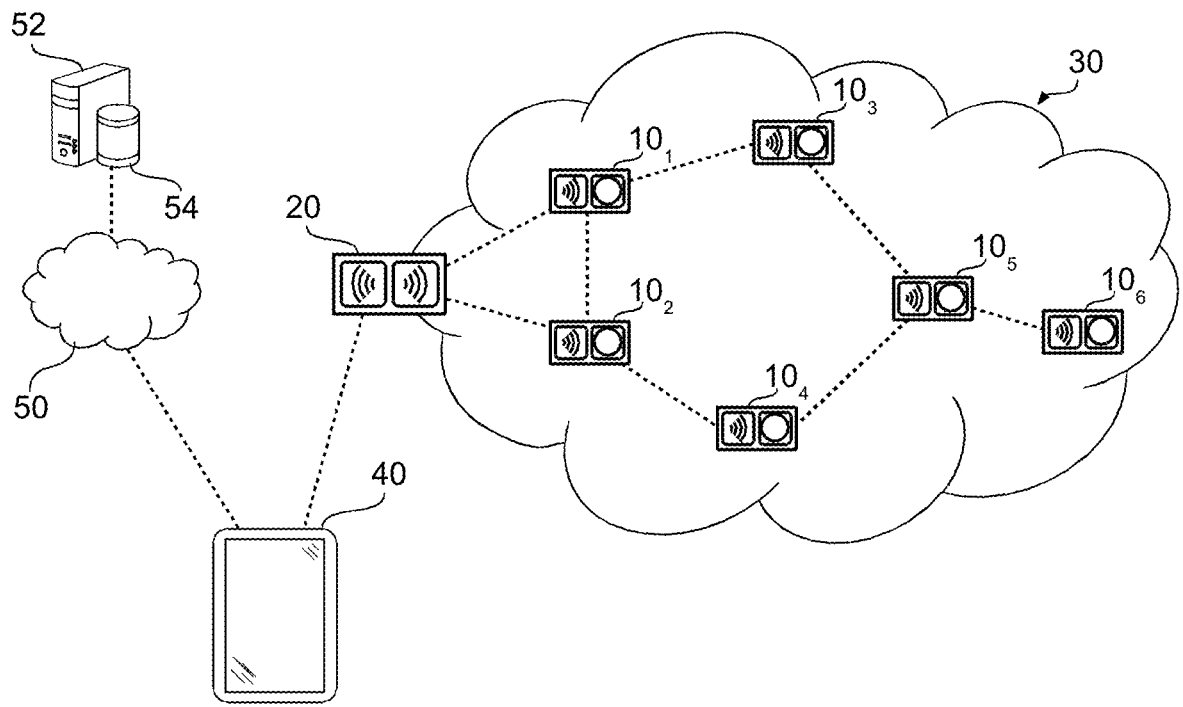
Figure 5B:
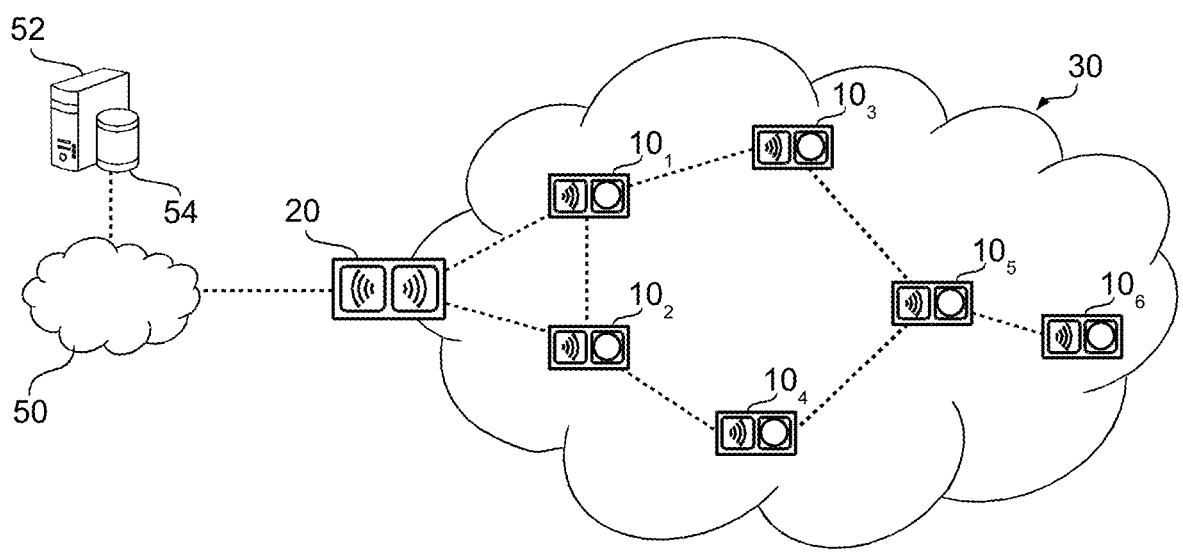
Figure 6:
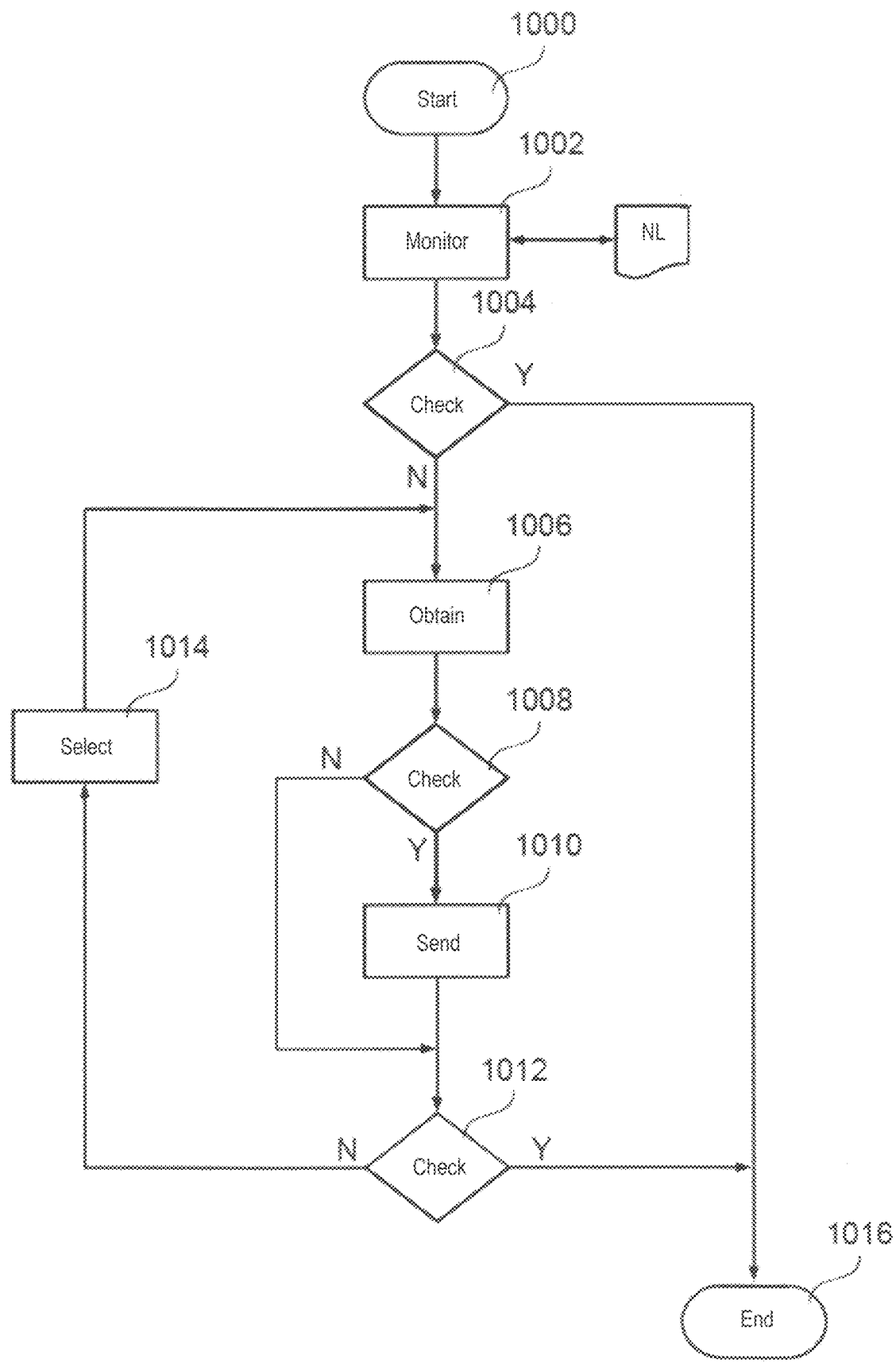
FIG. 6 shows a first embodiment of a node/lighting module configured to be connected to a multi-hop network according to the present specification.
Figure 7A:
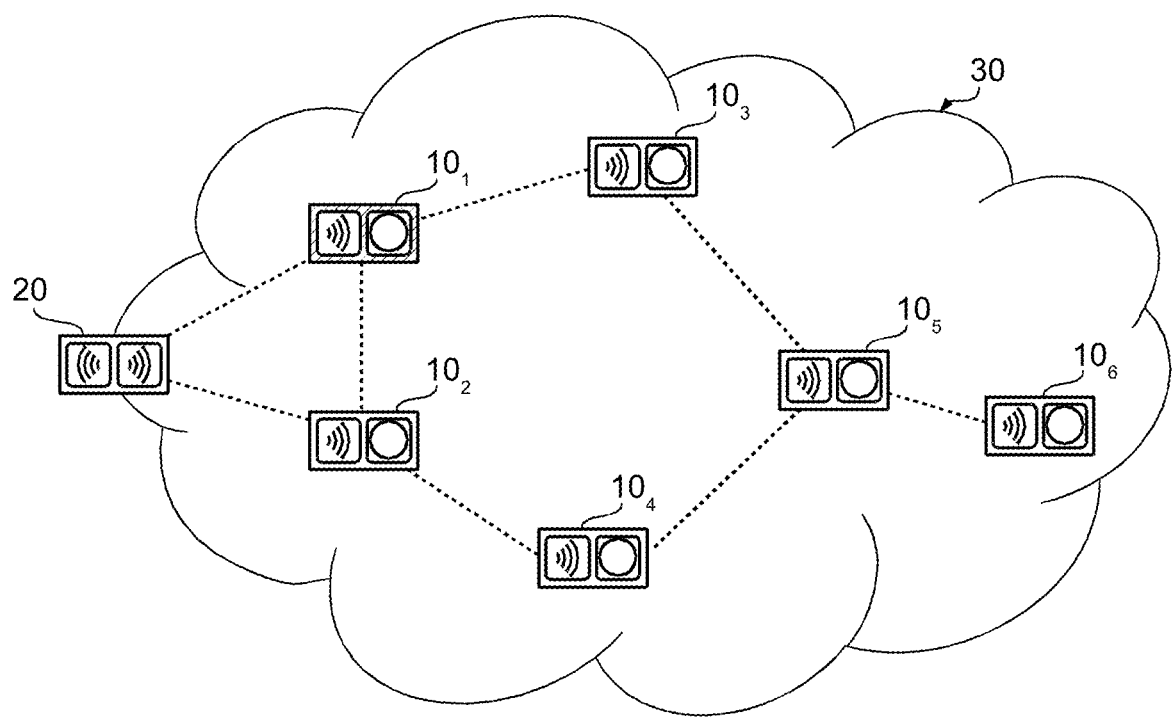
FIGS. 7a to 7d show an exemplary operation of nodes which operate as described in FIG. 6.
Figure 7B:
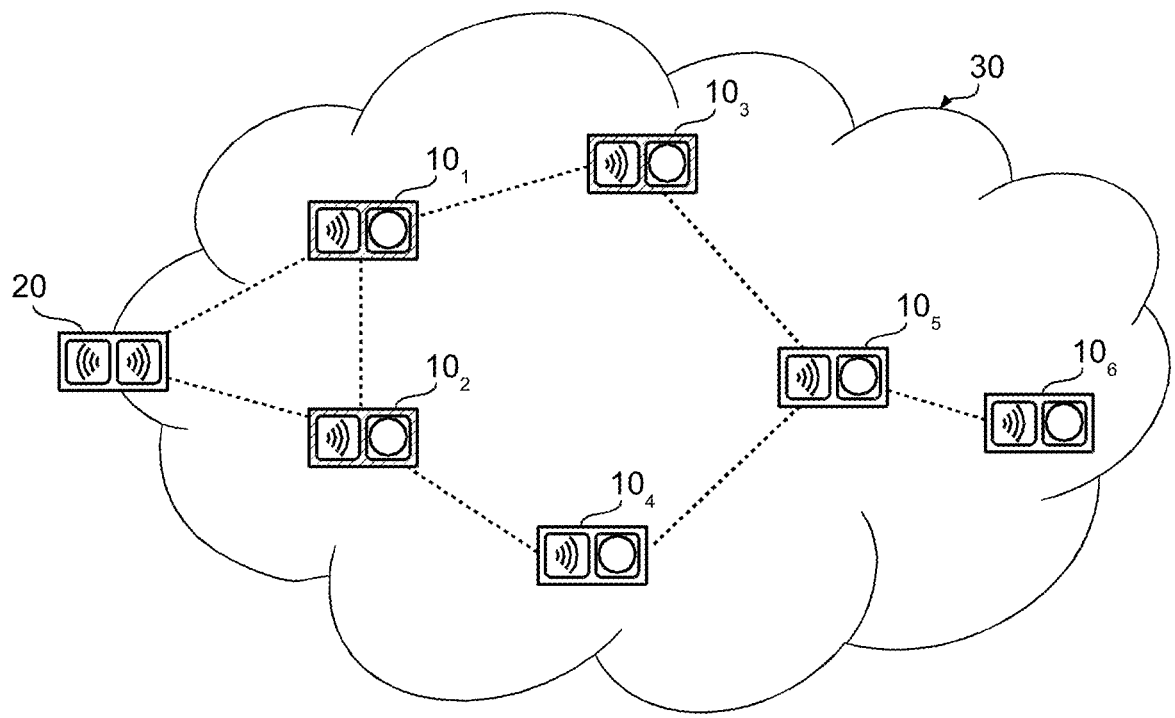
Figure 7C:
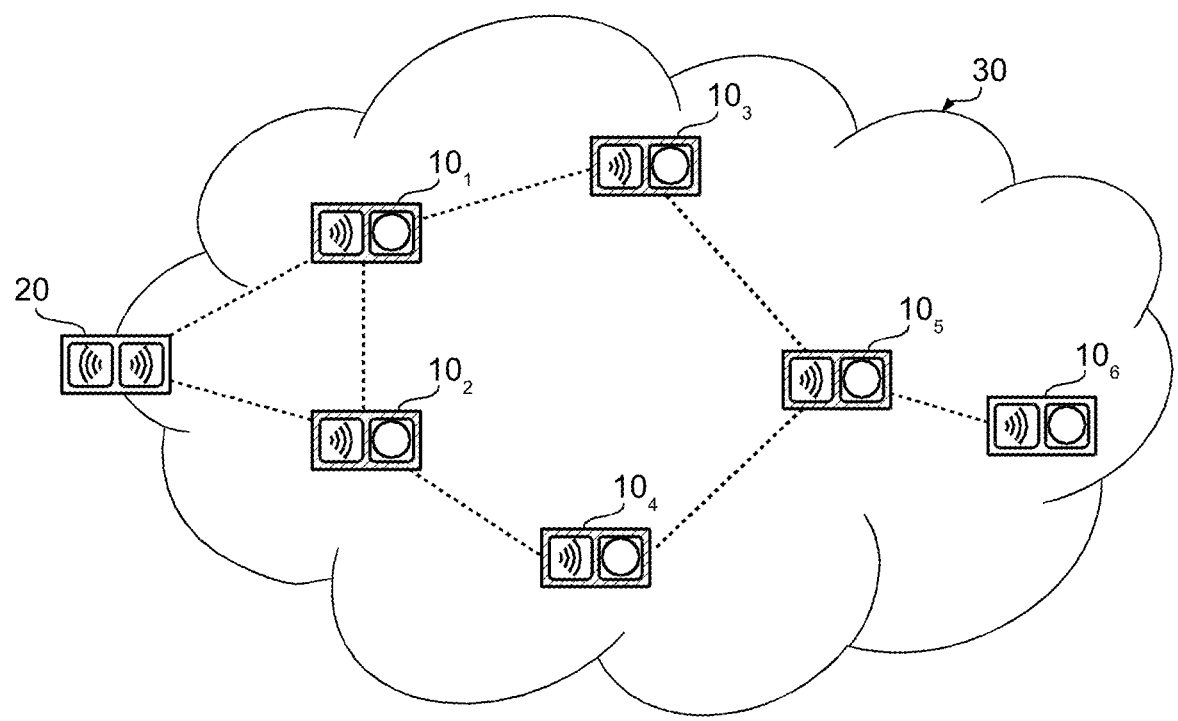
Figure 7D:
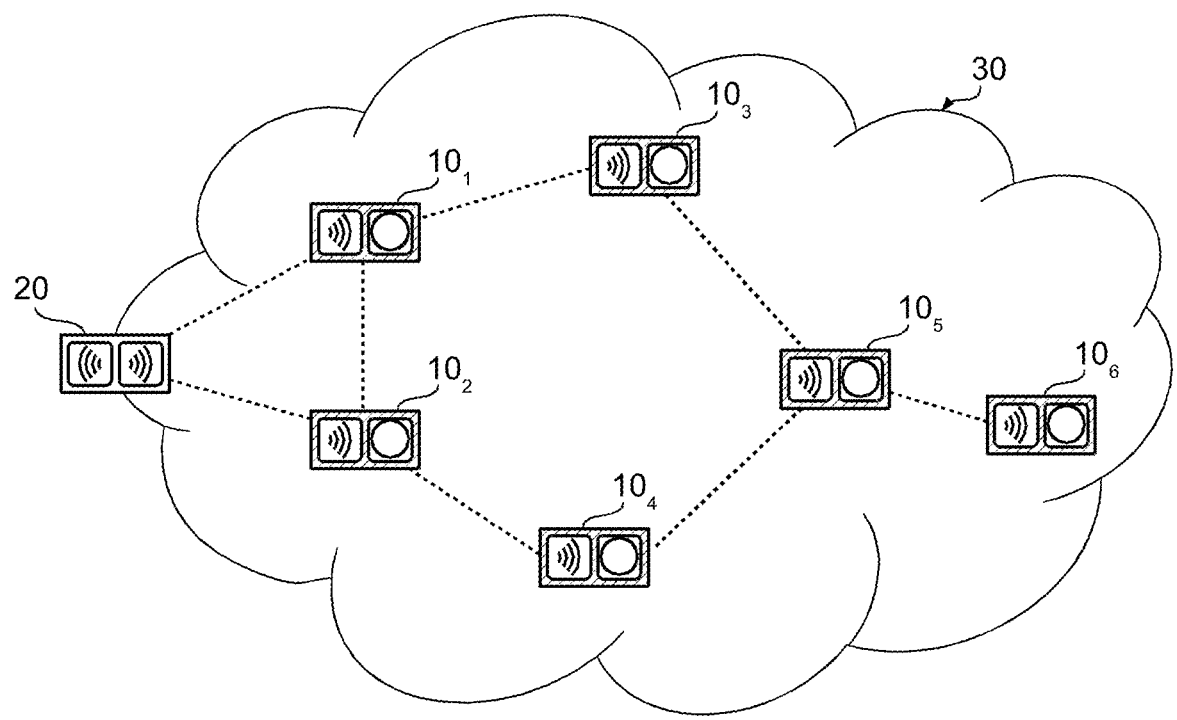

FIG. 6 shows a first embodiment of the operation of the additional module of a node/lighting module 10, which will be named "master node" in the following.

Specifically, after a start step 1000, the update module monitors, at a step 1002, the presence of other nodes/lighting modules 10 in the vicinity of the master node, which will be named "slave nodes" in the following. This step is usually employed in all multi-hop/mesh networks. For example, each node/lighting module 10 (and similarly the gateway node 20) may periodically send a broadcast message, containing data identifying the node/lighting module 10, such as e.g. a unique code, such as the serial number of the node/lighting module 10.

Therefore, the update module may create a list NL including the IDs of the slave nodes which are located in the vicinity of the respective master node. Specifically, "vicinity" means that said nodes may be reached directly, i.e. with a single hop, i.e. without the need of forwarding data packages through other nodes of the communication network 30.

Generally speaking, the monitoring function performed at step 1002 may also be implemented in the software module which manages the communication through network 30, because such information is useful for directing the communication through network 30.

At a subsequent step 1004, the update module checks if list NL is empty.

If list NL is empty (output "Y" of the verification step 1004), the update procedure ends at an end step 1016.

On the contrary, if list NL is not empty (output "N" at verification step 1004), the update module selects the first slave node of list NL as the current slave node, and proceeds to a step 1006.

Specifically, at step 1006, the update module obtains data which identify the type and the version of the firmware/software installed in the current slave node. Generally speaking, said information may be stored already in list NL, for example, because each node/lighting module 10 transmits said information with the broadcast message which also notifies its presence. Otherwise, the update module may send a query to the current slave node, in order to request the type and the version of the installed firmware/software.

At a subsequent step 1008, the update module checks whether the type of the current slave node corresponds to the type of the master node, and whether the version of the firmware/software installed in the master node is newer than the version of the firmware/software installed in the current slave node.

If the type of the current slave node corresponds to the type of the master node, and if the version of the firmware/software installed in the master node is newer than the version of the firmware/software installed in the current slave node (output "Y" of verification step 1008), the update module sends, at a step 1010, the firmware/software installed on the master node to the current slave node, i.e. the update module sends the firmware/software used by the master node to the current slave node.

Subsequently, the update module proceeds to a step 1012, in order to check if the current slave node is the last one in the list NL.

If the current slave node is the last one in the list NL (output "Y" of verification step 1012), the procedure ends at the end step 1016.

On the other hand, if the current slave node is not the last one in the list NL (output "N" of verification step 1012), the update module selects, at a step 1014, the following slave node, and the procedure is repeated at step 1006.

If the type of the current slave node does not correspond to the type of the master node, or if the version of the firmware/software installed in the master node is not newer than the version of the firmware/software installed in the current slave node (output "N" of verification step 1008), the update module may directly proceed to the verification step 1012, i.e. the update module does not attempt to update the current slave node.

FIGS. 7a to 7d show an example of the update of the nodes/lighting modules 10 of the communication network 30, assuming that all nodes are of the same type.

Specifically, in the presently considered embodiment, gateway node 20 starts updating network 30. As described with reference to FIGS. 5a and 5b, the update may be started manually, e.g. via device 40, or automatically by contacting a remote server 52.

At the beginning (FIG. 7a), the gateway node 20 sends the update to a first node/lighting module 10, e.g. the nearest node, e.g. node $10_1$.

In the following step (FIG. 7b), the gateway node 20 sends the update to a second node/lighting module 10, e.g. the following nearest node, e.g. node $10_2$. However, in the meanwhile, the updated node $10_1$ detects that at least node $10_3$ has not been updated yet, and therefore sends the updated firmware to that node as well.

In the following step (FIG. 7c), the gateway node 20 may only monitor the update of the network. As a matter of fact, during this step, the updated nodes $10_1$, $10_2$ and $10_3$ independently proceed to update the neighbour nodes. For example, node $10_1$ has no other neighbour nodes to update. On the contrary, node $10_2$ detects that at least node $10_4$ has not been updated yet, and therefore proceeds to send the updated firmware to that node as well. Similarly, node $10_3$ detects that at least node $10_5$ has not been updated yet, and therefore proceeds to send the updated firmware to that node, too.

Finally (FIG. 7d), node $10_5$ detects that node $10_6$ has not been updated yet, and therefore proceeds to send the updated software to said node, too.

Thanks to the knowledge of the network structure, the gateway node 20 may also determine the nodes 10 to which it is necessary to send the updated firmware, so as to speed up the network update.

Therefore, in various embodiments, the firmware update takes place in the same way as a virus, which propagates among the nodes/lighting modules 10.

Generally speaking, as an alternative or in addition to a point-to point update of a current slave node, the gateway node 10 and/or the update module may also send a multi-cast communication, addressed to all neighbour slave nodes which are of the same type and have an older firmware version.

Moreover, if at least one slave node of the same type is detected having an older firmware version, the update module may also send a broadcast communication to all neighbour slave nodes, and each slave node may analyse the communication and determine whether the firmware version is directed to its own type of node/lighting module 10, and whether the firmware version is newer than the installed version.

Figure 8A:
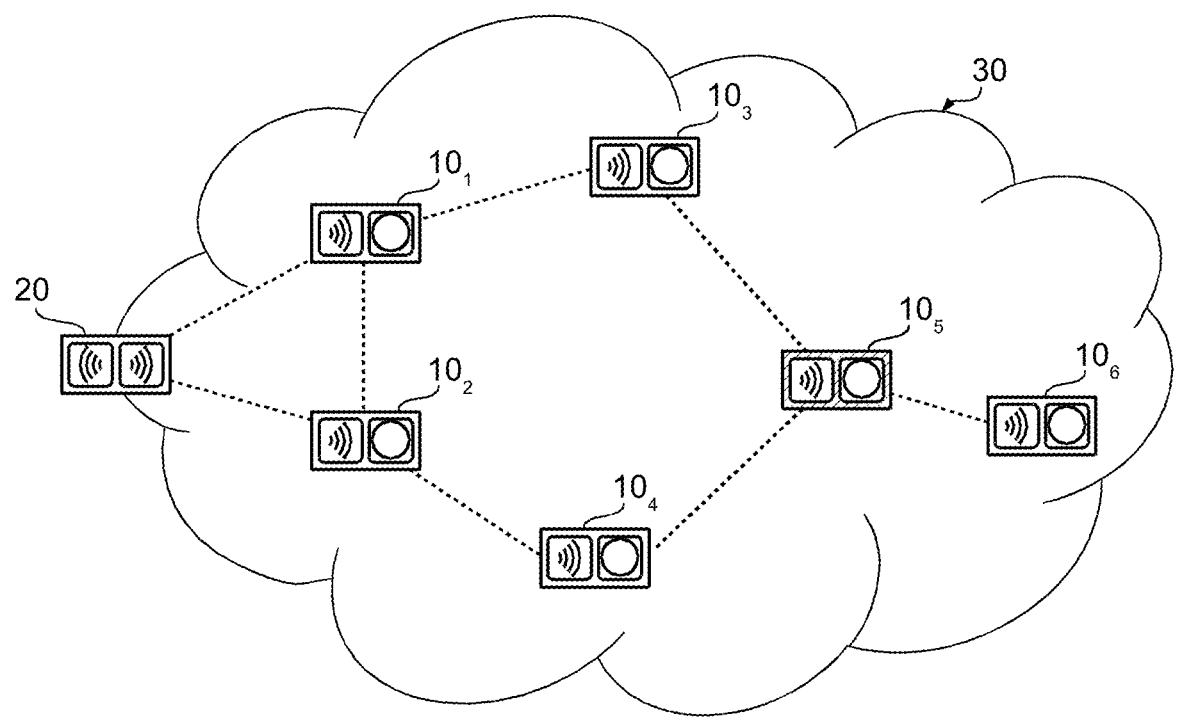
FIGS. 8a and 8b show a second exemplary operation of nodes/lighting modules according to the present specification.
Figure 8B:
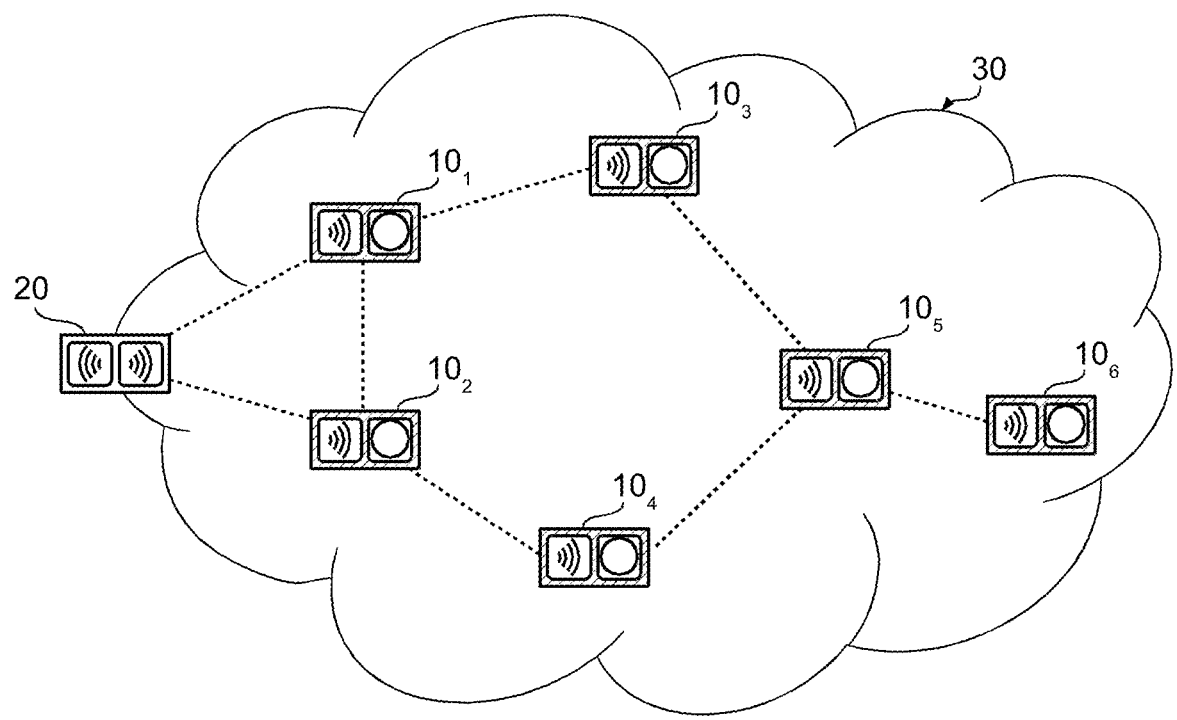

For example, FIGS. 8a and 8b show an example of the update of the nodes/lighting modules 10 of the communication network 30 through the use of multi-cast or broadcast communications.

For example, at the beginning (FIG. 8a), the gateway node 20 chooses to initially send the update to node $10_5$ via a point-to-point communication.

As a matter of fact, in the following step (FIG. 8b), the gateway node 20 may use a multi-cast or broadcast communication, in order to simultaneously update nodes $10_1$ and $10_2$. In the meanwhile, the updated module $10_5$ may employ a multi-cast or broadcast communication in order to simultaneously update modules $10_3$, $10_4$ and $10_6$.

Figure 9:
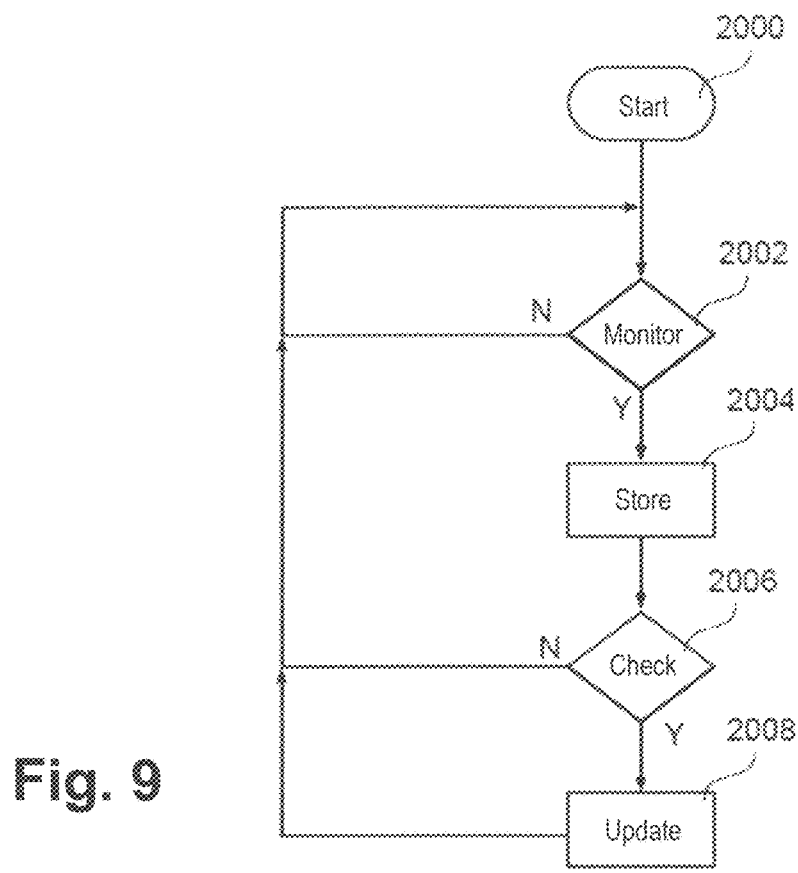
FIG. 9 shows a further embodiment of a node/lighting module configured to be connected to a multi-hop network according to the present specification.

FIG. 9 shows a second embodiment of the update module of a node/lighting module 10. Generally speaking, the operation of said module may also be combined with the previously described operation.

After a start step 2000 the update module monitors, at a step 2002, the communications that the respective node/lighting module 10 is supposed to forward to another node/lighting module 10, i.e. the multi-hop communications which pass through node 10.

If said communications do not include firmware (output "N" of the verification step 2002), the update module returns to step 2002, in order to monitor the following communication.

On the other hand, if said communications include firmware (output "Y" of the verification step 2002), at a step 2004 the update module stores the firmware also locally, i.e. within node 10, without however executing the update.

Once the node/lighting module 10 has received and forwarded the whole firmware, the update module checks, at a step 2006, whether the locally stored firmware is compatible with the respective node/lighting module 10, i.e. whether the type corresponds and whether the firmware version is newer.

If the received firmware is compatible and newer (output "Y" of verification step 2006), the update module updates, at a step 2008, the firmware of the respective node/lighting module 10 and returns to step 2002.

On the other hand, if the received firmware is not compatible nor newer (output "N" of verification step 2006), the update module returns to step 2002.

Generally speaking, the update module may delete the received firmware, or may store the firmware (albeit non compatible). As a matter of fact, as previously described, the update module may attempt to update other slave nodes in the vicinity, which are compatible with the locally stored firmware(s), by using in this case the stored firmware, i.e. the firmware incompatible with the master node, instead of the firmware of the master node.

Figure 10A:
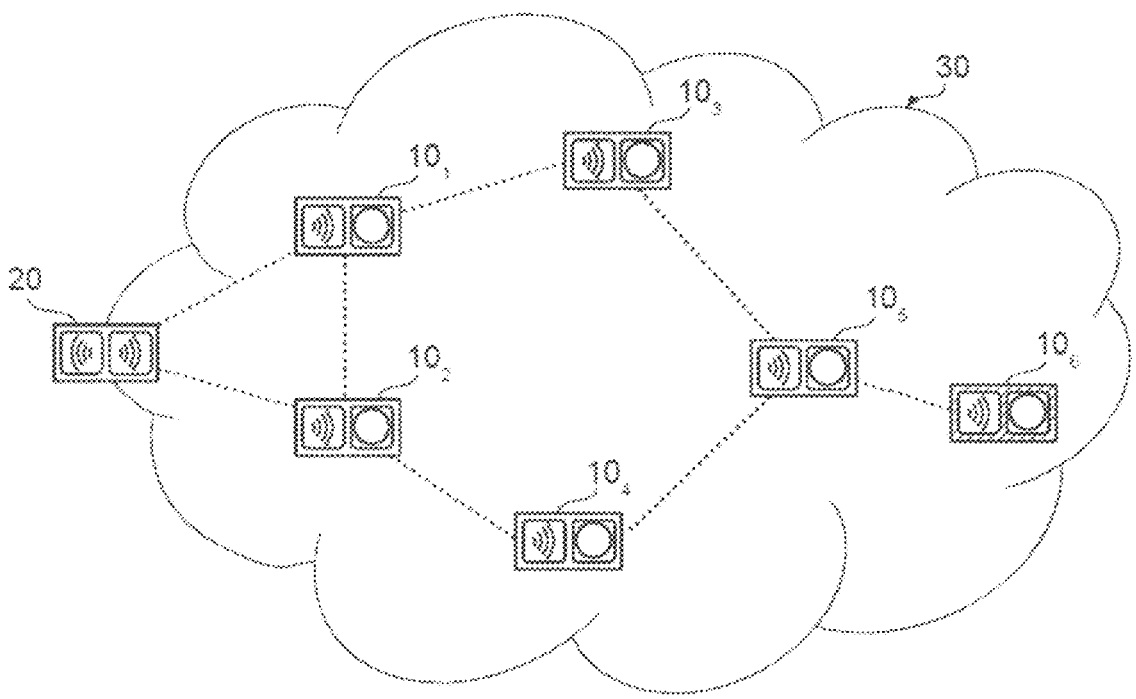
FIGS. 10a to 10c show an exemplary operation of nodes operating as described in FIG. 9.
Figure 10B:
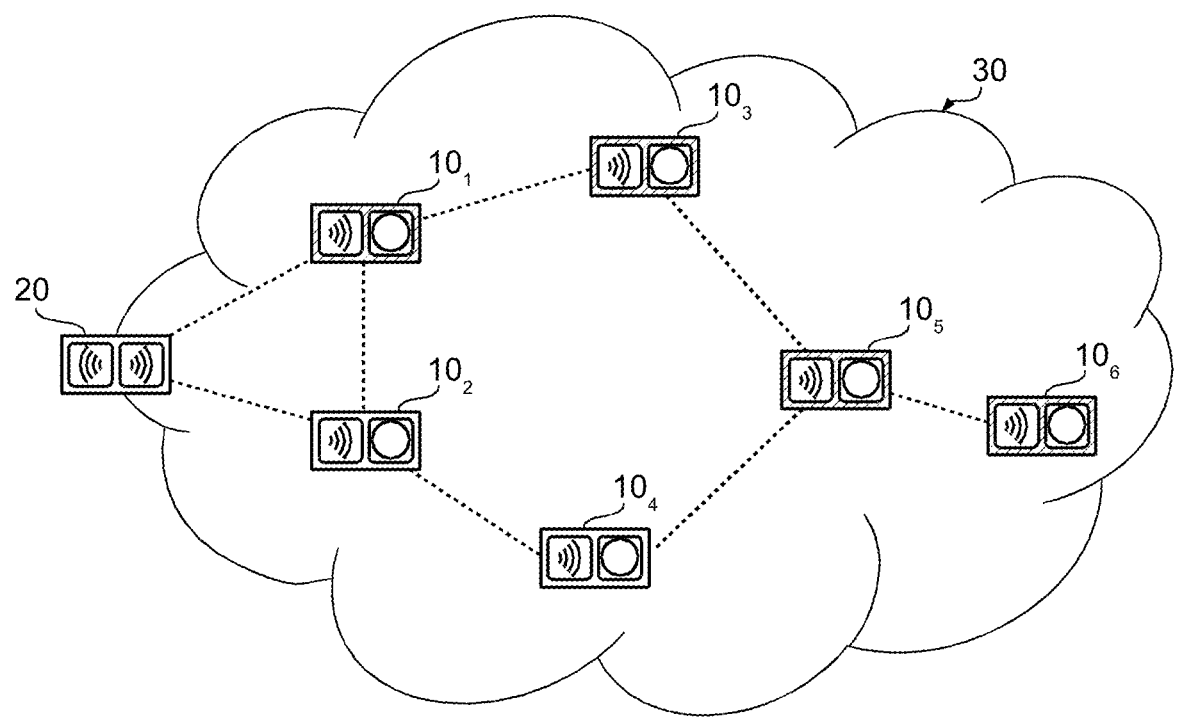
Figure 10C:
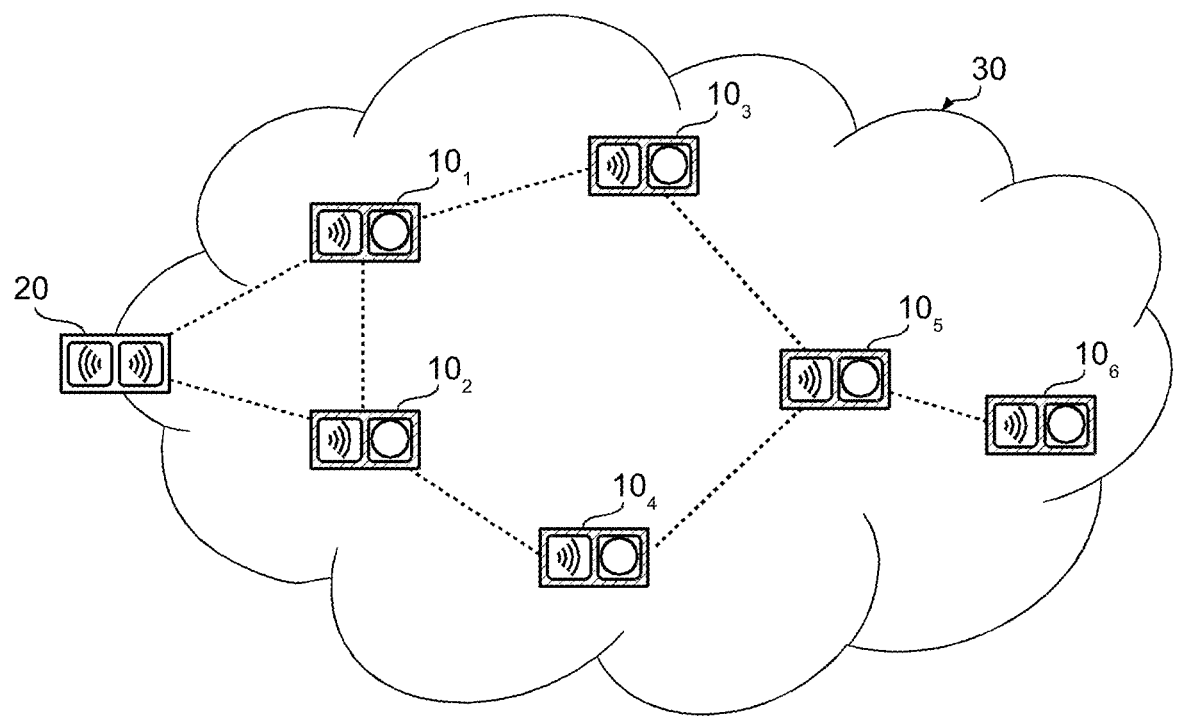

For example, FIGS. 10a to 10c show an example wherein both functions are used jointly in the update module.

For example, at the beginning (FIG. 10a), the gateway node 20 chooses to initially send the update to node $10_6$ via a point-to-point and multi-hop communication. For example, said communication is forwarded through nodes $10_1$, $10_3$ and $10_5$. Therefore, as previously described with reference to FIG. 9, the update modules of said nodes/lighting modules 10 also locally store, during information forwarding, a copy of the firmware.

Therefore, as shown in FIG. 10b, the update module of nodes $10_1$, $10_3$ and $10_5$ may make use of the firmware copy in order to update the respective node.

Finally, the updated nodes, i.e. nodes $10_1$, $10_3$, $10_5$ and $10_6$, may monitor the neighbouring nodes and update such nodes. For example, node $10_1$ may update node $10_2$ and node $10_5$ may update node $10_4$.

Therefore, thanks to the presently described solutions, the update may be carried out in a distributed fashion, by updating one or more nodes/lighting modules 10 of the network, which in turn will update other neighbour nodes.

As previously mentioned, the update modules of the nodes/lighting modules 10 are adapted to update only devices in the immediate vicinity. Therefore, such communications are performed as single-hop communications, which also speeds up data transmission.

If some of the nodes/lighting modules cannot be updated in this way, the device 40 (see FIG. 5a) or the gateway node (see FIG. 5b) may send the updated firmware via a point-to-point and multi-hop communication to these nodes, which in turn will provide updating to the neighbour modules.

The intermediate nodes of this multi-hop communication store the firmware locally and perform their own update (if compatible) and optionally the update of other nodes 10.

Therefore, the update of the nodes/lighting modules 10 is started by device 40 or gateway node 20, and then the update takes place automatically. In various embodiments, the gateway node 20 or the device 40 (via the gateway node) may also send broadcast communications, in order to request information about the update status of each node. For example, in order to reduce the risk of a simultaneous response of several nodes 10, the query may specify a time interval, and each node 10 may respond after a random time included in said time interval.

Generally speaking, the update of network 30 is therefore also performed by inserting a new node/lighting module 10 having an updated firmware into the communication network 10.

Therefore, the solutions described herein enable a reduction of the time needed to carry out the update of the nodes 10 of network 30. Moreover, the update of one single node 10 is often sufficient to automatically update all the nodes 10 of network 30. Therefore, the user does not need to provide an individual update to each node 10. Moreover, a homogeneous network ensures that all nodes 10 are updated to the same firmware version.

Of course, the implementation details and the embodiments may vary, even appreciably, with respect to what has been described herein by way of non-limiting example only, without departing from the spirit and scope of the invention as defined by the annexed claims.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes that come within the meaning and range of equivalency of the claims are therefore intended to be embraced.

The invention claimed is:

1. A node for a multi-hop communication network, comprising:
   a wireless communication interface configured to exchange data with the multi-hop communication network;
   a processing unit configured to command the operation of the node as a function of commands received via the wireless communication interface;

a memory which contains a firmware for the processing unit;

wherein the node is configured for:

receiving, via the wireless communication interface, an updated firmware;

storing the updated firmware in the memory;

detecting, via the wireless communication interface, a plurality of other nodes which are in the vicinity of the node and are reachable via a single-hop communication;

sending the firmware stored in the memory to one or more of the other nodes;

detecting a model number of the node and a version of the firmware stored in the memory;

detecting, for each of the other nodes which are in the vicinity of the node, a respective model number and a respective firmware version; and determining, for each of the other nodes which are in the vicinity of the node, whether the model number of the node corresponds to the model number of the respective other node;

determining, for each of the other nodes which are in the vicinity of the node, whether the version of the firmware of the node is newer than the firmware version of the respective other node; and sending the firmware stored in the memory to the other nodes which have a model number which corresponds to the model number of the node and a firmware version which is older than the firmware version of the node.

2. The node according to claim 1, wherein the sending to one or more of the other nodes the firmware stored in the memory, comprises sending the firmware stored in the memory to the other nodes via a point-to-point communication.

3. The node according to claim 1, wherein the receiving via the wireless communication interface an updated firmware comprises:

analyzing a point-to-point, multi-cast or broadcast communication addressed to the node.

4. The node according to claim 1, wherein the receiving via the wireless communication interface an updated firmware comprises:

analyzing the content of a multi-hop communication passing through the node.

5. The node according to claim 1, wherein the storing the updated firmware in the memory comprises:

determining whether the updated firmware received via the wireless communication interface is compatible with the node; and in case the updated firmware is compatible with the node, storing the updated firmware in the memory, such that the processing unit uses the updated firmware.

6. The node according to claim 1, comprising one or more sensors and/or actuators.

7. The node according to claim 1, wherein the node is a lighting module comprising:

an electronic converter configured to power at least one light source, wherein the processing unit is configured to command the operation of the electronic converter as a function of commands received via the wireless communication interface.

8. A lighting system comprising a plurality of nodes according to claim 7.

9. The lighting system according to claim 8, comprising a gateway node comprising:

a wireless communication interface configured to exchange data with the multi-hop communication network;

one or more further communication interfaces for a wired or wireless communication; and a processing unit configured to manage the exchange of data between the one or more further communication interfaces and the wireless communication interface.

10. A method of updating the software of lighting modules in a lighting system according to claim 8, comprising:

receiving from a remote server an updated firmware, and sending the updated firmware to at least one of the nodes.

11. The node according to claim 1, wherein the sending to one or more of the other nodes the firmware stored in the memory, comprises sending the firmware stored in the memory to the other nodes via a multi-cast communication.

12. The node according to claim 1, wherein the sending to one or more of the other nodes the firmware stored in the memory, comprises sending the firmware stored in the memory to the other nodes via a broadcast communication.

13. A non-transitory computer readable medium having computer executable instructions that cause a processing unit to perform a method, wherein the processing unit is part of a node for a multi-hop communication network; wherein the node comprises a wireless communication interface configured to exchange data with the multi-hop communication network, wherein the method comprises:

receiving via the wireless communication interface an updated firmware;

storing the updated firmware in a memory;

detecting, via the wireless communication interface, a plurality of other nodes which are in the vicinity of the node and are reachable via a single-hop communication;

sending the firmware stored in the memory to one or more of the other nodes;

detecting a model number of the node and a version of the firmware stored in the memory;

detecting, for each of the other nodes which are in the vicinity of the node, a respective model number and a respective firmware version; and determining, for each of the other nodes which are in the vicinity of the node, whether the model number of the node corresponds to the model number of the respective other node;

determining, for each of the other nodes which are in the vicinity of the node, whether the version of the firmware of the node is newer than the firmware version of the respective other node; and sending the firmware stored in the memory to the other nodes which have a model number which corresponds to the model number of the node and a firmware version which is older than the firmware version of the node.

* * * * *